United States Patent [19]
Stadnick et al.

[11] Patent Number: 5,763,115
[45] Date of Patent: Jun. 9, 1998

[54] RESETTING THE PRECHARGE OF A GROUP OF PRESSURIZED GAS ENERGY STORAGE CELLS DURING SERVICE

[76] Inventors: Steven J. Stadnick, 4223 Clubhouse Dr., Lakewood, Calif. 90712; Howard H. Rogers, 18361 Van Ness Ave., Torrance, Calif. 90504

[21] Appl. No.: 683,009

[22] Filed: Jul. 16, 1996

[51] Int. Cl.$^6$ ................................................ H01M 10/44
[52] U.S. Cl. ............................ 429/50; 429/53; 429/120
[58] Field of Search ........................... 429/53, 120, 50

[56] References Cited

U.S. PATENT DOCUMENTS

| | | |
|---|---|---|
| 3,669,744 | 6/1972 | Tsenter et al. . |
| 4,000,350 | 12/1976 | Wittmann . |
| 4,250,235 | 2/1981 | DuPont et al. . |
| 4,262,061 | 4/1981 | Rogers . |
| 4,283,844 | 8/1981 | Milden et al. . |
| 4,369,212 | 1/1983 | Rogers et al. . |
| 4,683,178 | 7/1987 | Stadnick et al. . |
| 5,264,301 | 11/1993 | Sindorf et al. ............... 429/53 |

OTHER PUBLICATIONS

Rubin, L. R. "Purification of Hydrogen by Permeation Through Palladium and Palladium Alloys," *Engelhard Industries Inc Technical Bulletin*, vol. II, No. 1, pp. 8–15 (1961, Jun.).

*Primary Examiner*—John S. Maples

[57] ABSTRACT

A group of electrically interconnected energy storage cells, such as nickel-hydrogen energy storage cells, is pressure balanced and its precharge reset by discharging the energy storage cells of the group to a substantially fully discharged state, venting all of the energy storage cells of the group to the same reduced internal hydrogen pressure, and thereafter discontinuing the venting. The venting occurs without recharging the energy storage cells, and after venting is complete the energy storage cells of the group are recharged.

14 Claims, 3 Drawing Sheets

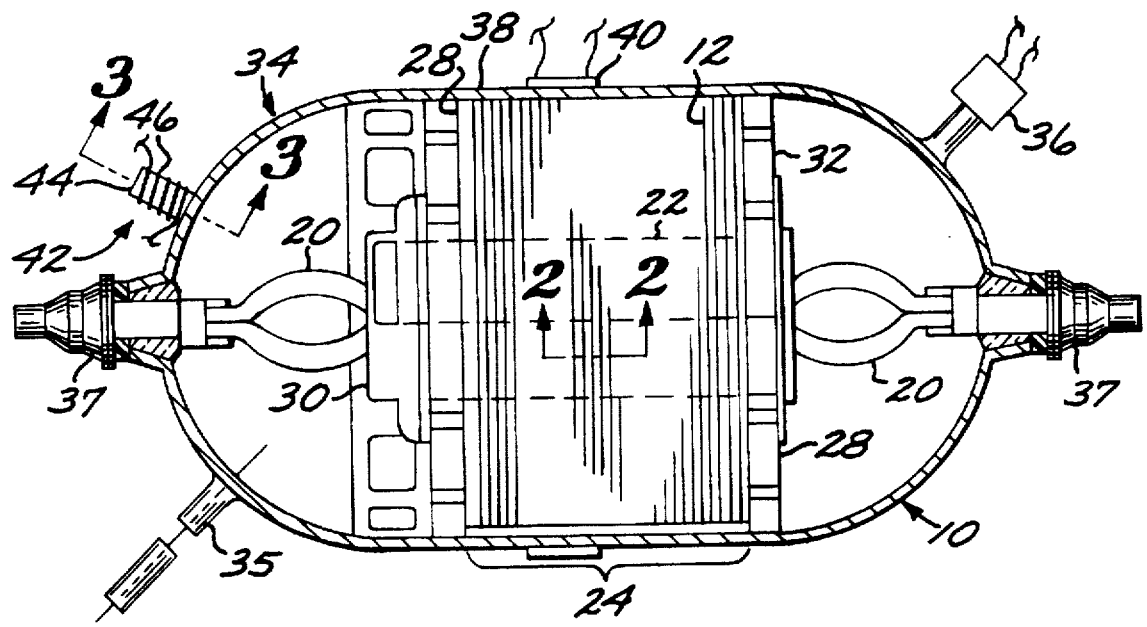
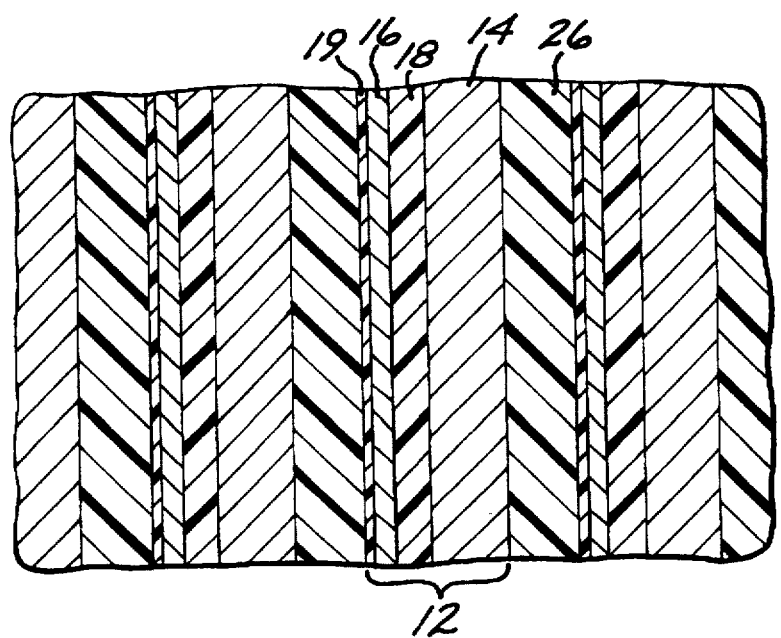

RESETTING THE PRECHARGE OF A GROUP OF PRESSURIZED GAS ENERGY STORAGE CELLS DURING SERVICE

BACKGROUND OF THE INVENTION

This invention relates to energy storage cells, and, more particularly, to pressurized gas energy storage cells such as nickel-hydrogen energy storage cells.

Rechargeable cells or batteries are electrochemical energy storage devices for storing and retaining an electrical charge and later delivering that charge as useful power. Familiar examples of the rechargeable energy storage cell are the lead-acid cell used in automobiles and the nickel-cadmium cell used in various portable electronic devices. Another type of energy storage cell having a greater storage capacity for its weight is the nickel oxide/pressurized hydrogen energy storage cell, an important type of which is commonly called the nickel-hydrogen energy storage cell and is used in spacecraft applications. The weight of the spacecraft energy storage cell must be minimized while achieving the required performance level, due to the cost of lifting weight to earth orbit and beyond.

The nickel-hydrogen energy storage cell includes a series of active plate sets which store an electrical charge electrochemically and later deliver that charge as a useful current. The active plate sets are packaged within a hermetic pressure vessel that contains the plate sets and the hydrogen gas that is an essential active component of the energy storage cell. Each plate set includes a positive electrode, a negative electrode, and a separator between the two electrodes, all soaked with an electrolyte. In a typical energy storage cell, a number of plate sets are supported on a core under a compressive loading, with a gas screen between each plate set and with electrical connector leads extending to each electrode of each plate set. The gas screen provides a gas channel from the hydrogen electrode to the gas space outside the stack. A single nickel-hydrogen energy storage cell delivers current at about 1.3 volts, and a number of the energy storage cells are usually electrically interconnected in series to produce current at the voltage required by the systems of the spacecraft.

During the operation of the nickel-hydrogen energy storage cell, hydrogen is produced within the pressure vessel. The hydrogen is intentionally produced during the charging portion of the charging/discharging cycle. Hydrogen is also undesirably produced by other mechanisms such as corrosion of the components within the energy storage cell by the electrolyte during extended service. With increasing service, the maximum hydrogen pressure within the energy storage cell could gradually rise to a value above the design limit of the pressure vessel and which could cause the pressure vessel to fail.

As indicated, a number of electrochemical energy storage cells, typically 24 or more, are electrically interconnected in a practical battery system. As the battery system experiences large numbers of charging/discharging cycles in service, the maximum hydrogen pressure reached in the cycle by each energy storage cell gradually increases in a nonuniform manner. That is, the maximum hydrogen pressure varies from cell to cell of the battery system. Because the maximum hydrogen pressure cannot exceed the structural design limit for each of the energy storage cells, the maximum charge that can be retained by the energy storage cells during the charging cycle becomes limited by that cell having the largest hydrogen pressure. Thus, the maximum charge of the energy storage cells gradually falls with increasing numbers of cycles, as determined by whichever of the energy storage cells experiences the greatest hydrogen overpressure. The hydrogen overpressure growth cannot be reliably predicted by any known technique, and therefore the spacecraft battery system must be designed with a reduced capacity.

There is a need for a technique for avoiding the limit on battery system charging capacity that results from the gradual buildup of hydrogen overpressures in the individual energy storage cells. The present invention fulfills that need, and further provides related advantages.

SUMMARY OF THE INVENTION

The present invention provides a technique for balancing pressures and resetting the precharge in a battery system having electrically interconnected pressurized-hydrogen energy storage cells. Little weight is added to the battery system, but battery energy storage capacity is periodically returned to its initial high level over extended periods of use. The approach of the invention is readily implemented without loss of function of the battery system. This approach is applicable in a wide variety of battery system applications, but finds its greatest value in satellites such as geosynchronous communications satellites, which remain in orbit and functional for many years.

In accordance with the invention, a method for pressure balancing a group of electrically interconnected energy storage cells comprises the steps of providing a group of at least two electrically interconnected pressurized-hydrogen energy storage cells, and discharging the energy storage cells of the group to a substantially fully discharged state (typically 10 percent or less of their fully charged states). The method further includes venting all of the energy storage cells of the group to a reduced internal hydrogen pressure, preferably a uniform value of near 0 psia, thereafter discontinuing the venting, without recharging the energy storage cells, and thereafter recharging the energy storage cells of the group.

Venting is preferably accomplished through a vent segment of the wall of the hermetic pressure vessel of each of the energy storage cells. The vent segment is made of a material that permits the catalyzed diffusion of hydrogen therethrough. The vent segment is controllably heated to increase the rate of diffusion through the vent segment. The diffusion rate of hydrogen through the vent segment and thence out of the energy storage cell is a function of the hydrogen pressure within the energy storage cell. Venting of the energy storage cells in this manner leads to an evening of the pressure within the group of cells without the need for a complex pressure control mechanism. According to this method, venting is not performed when the energy storage cells have a substantial charge, and thence a substantial internal hydrogen pressure, even though the venting could be accomplished more rapidly. Under such circumstances, too much hydrogen might be released and the energy storage cells could not then be properly charged.

After the group of energy storage cells is returned to service with a more-uniform discharged-state hydrogen pressure, the group of cells is further cycled through the charging/discharging cycles. During charging, the energy storage cells reach comparable maximum hydrogen pressures, so that a much-larger maximum pressure of any one cell does not result in a significantly reduced storage capacity. With increasing numbers of cycles, the nonuniformity of hydrogen pressures within the various cells may reappear, but in that case the technique of the invention may be repeated to again reset the initial precharge.

The present invention thus provides an advance in pressurized-hydrogen battery systems by permitting the in-flight, remote resetting of the charge state and balancing of the pressures within the energy storage cells of the battery system. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a sectional elevational view of a flight-type nickel-hydrogen energy storage cell;

FIG. 2 is a detail of FIG. 1, taken generally on line 2—2 and illustrating the plate sets;

DETAILED DESCRIPTION OF THE INVENTION

Figure 3:
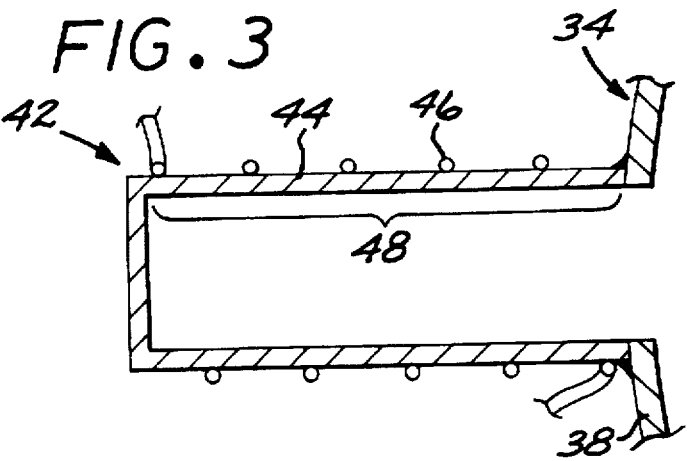
FIG. 3 is a detail of FIG. 1, taken generally on line 3—3 and illustrating the hydrogen vent system.

The present invention is preferably used in conjunction with a number of electrically interconnected nickel-hydrogen energy storage cells 10, one of which is illustrated in FIGS. 1–2, of the pressurized gas-metal cell type. Such an energy storage cell 10 typically comprises a plurality of individual plate sets 12. Each plate set in turn comprises an anode or positive electrode 14, a cathode or negative electrode 16, and an electrolyte-containing separator 18, which physically separates the electrodes 14 and 16 and also supplies the electrolyte medium through which ionic and electron charge transfer occurs. Charging and discharging of the electrodes 14 and 16 are accomplished through respective electrical leads 20.

Various constructions of nickel-hydrogen cells and components are disclosed in the following U.S. Patents, whose disclosures are herein incorporated by reference: U.S. Pat. Nos. 4,683,178; 4,369,212; 4,283,844; 4,262,061; 4,250,235; 4,000,350; and 3,669,744.

The positive electrode 14 is formed by impregnating nickel hydroxide into porous sintered nickel that is supported on an etched nickel electrode substrate. The negative electrode 16 is coated on one side by a sintered mixture of platinum black and polytetrafluoroethylene and on the other side with a porous layer 19 of polytetrafluoroethylene. These layers are applied to a nickel substrate in the form of etched sheet or a woven mesh, to form the negative electrode 16. Many different types of separators 18 have been used, including, for example, asbestos, nylon, and a cloth of zirconium oxide-yttrium oxide. The electrolyte, preferably a 26 or 31 percent by weight concentration of aqueous potassium hydroxide, is impregnated into the separator 18.

The individual plate sets 12 are assembled onto a central core 22 to form a stacked array 24. A monofilament polypropylene screen 26 is placed between each plate set 12 during assembly, so that oxygen liberated during overcharging at each positive electrode 14 can diffuse away from the electrode 14 and to the negative electrode 16 to combine with hydrogen. The stacked array 24 is placed under a longitudinal pressure of, for example, about 10 pounds per square inch, by tightening compression plates 28 against each end of the stacked array 24. The tightening of the compression plates 28 is preferably accomplished by compressing the array 24 and then tightening a nut 30 on threads on the core 22, thereby compressing a Belleville washer set 32 against the compression plate 28 to hold the stacked array 24 in place.

The stacked array 24 is contained within a hermetically sealed pressure vessel 34 having a wall 38 manufactured of a first material such as Inconel 718 nickel-base alloy which can withstand internal pressures on the order of 1,000 psia, without damage by hydrogen embrittlement. The first material has a relatively low diffusion coefficient of hydrogen therethrough, so that hydrogen is contained within the interior of the pressure vessel 34. A gas fill tube 35 allows gas content and pressure within the pressure vessel 34 to be established initially, but the tube 35 is sealed after the initial charging procedures. The pressure vessel 34 is typically constructed in the form of a cylindrical tube having domed ends. By way of illustration, the nickel-hydrogen energy storage cell 10 having the pressure vessel 34 of external dimensions of 3½ to 5½ inches in diameter by 13–15 inches long contains about 40–100 individual plate sets 12, with a resulting electrical storage capacity of the cell of about 50 to about 350 ampere-hours. The energy storage cell 10 may be charged and discharged through thousands of cycles without apparent damage, if the charging and discharging are accomplished properly. A number of energy storage cells 10 are ordinarily combined in series or parallel arrangements as a battery, as will be discussed subsequently.

The electrical leads 20 pass from the interior of the pressure vessel 34 to its exterior through electrical feedthroughs 37. The pressure within the pressure vessel 34 may optionally be monitored by any operable technique. One such pressure-monitoring device is a pressure gauge 36 communicating with the interior of the pressure vessel, which measures interior pressure directly. Another pressure-monitoring device is a strain gage 40 mounted to the exterior of the wall 38 of the pressure vessel 34. The deformation of the wall 38, as measured by the strain gage 40, is a function of the internal pressure within the pressure vessel 34, which functional dependence is determined in initial calibration testing. The strain gage 40 approach to pressure measurement is preferred, inasmuch as the strain gage is lighter than the pressure gauge.

A hydrogen vent 42 is provided as a segment of the wall 38 of the pressure vessel 34. The hydrogen vent 42 is a portion of the wall made of a second material that permits the catalyzed diffusion of hydrogen therethrough. The hydrogen vent 42 may be a piece of the second material mounted into the wall of the pressure vessel, but more preferably it is in the form of a hollow tube as will be discussed subsequently. (The term "hydrogen vent" as used herein in respect to the preferred embodiment means a solid section or portion of the wall through which hydrogen diffuses rapidly as compared with the remainder of the wall. "Vent" as used herein does not include a grillwork or the like, which would permit convective flow of gas therethrough in both directions, thereby rendering the package non-hermetic.) A preferred second material is pure palladium or a palladium alloy. An operable palladium alloy is a palladium-silver alloy such as palladium-25 weight percent silver.

The hydrogen vent 42 is preferably in the form of a generally cylindrical hollow tube 44, as shown in FIG. 3. The hollow tube 44 is affixed to the wall 38 of the pressure vessel 34. The hollow tube 44 is closed on one end, and on the other end communicates with the interior of the pressure vessel 34. All or a portion of the hollow tube 44 is made of the second material. The hollow tube 44 is typically about 3 inches long by 0.180 inches outside diameter, and has a wall thickness of about 0.020 inches.

The catalyzed diffusion process produces an effective diffusion rate of hydrogen out of the interior of the hollow tube 44 and thence from the interior of the pressure vessel 34 that is a function of the temperature of the material that forms the hollow tube 44. To achieve controllability of the net diffusion of hydrogen out of the interior of the pressure vessel 34, the thickness of the hydrogen vent 42 portion of the hollow tube 44 is preferably made sufficiently thick (e.g., about 0.020 inches) that there is little diffusion therethrough at ambient temperature, but that the diffusion of hydrogen therethrough is significantly increased at moderately elevated temperatures. To achieve a moderately elevated temperature in the hydrogen vent 42, a heater 46 in the form of an insulated electrical resistance wire made of, for example, 80 weight percent nickel, 20 weight percent chromium (a commercially available alloy termed "nichrome V"), is wound around the hollow tube 44. By controllably passing an electrical current through the heater 46, the hollow tube 44 is heated and the diffusion rate of hydrogen therethrough is increased significantly. In actual operation of the hydrogen vent, the reduction of hydrogen pressure can take place over a period of hours or days, and therefore the diffusion rate out of the pressure vessel 34 through the hydrogen vent 42 need not be large. Moderate elevated temperatures of about 200° C. are therefore preferably used for the venting operation, but higher or lower temperatures are also operable.

The described diffusional hydrogen vent 42 is presently preferred. However, other types of vents such as mechanical valves or tortuous leak paths may also be used. Such other approaches are equivalent in that they achieve a controllable reduction of internal hydrogen pressure in the energy storage cell 10. The present approach is preferred because it is precisely controllable, adds little weight to the battery system, does not permit reverse diffusion of contaminants from the exterior to the interior of the energy storage cell, and is reliable.

Figure 4:
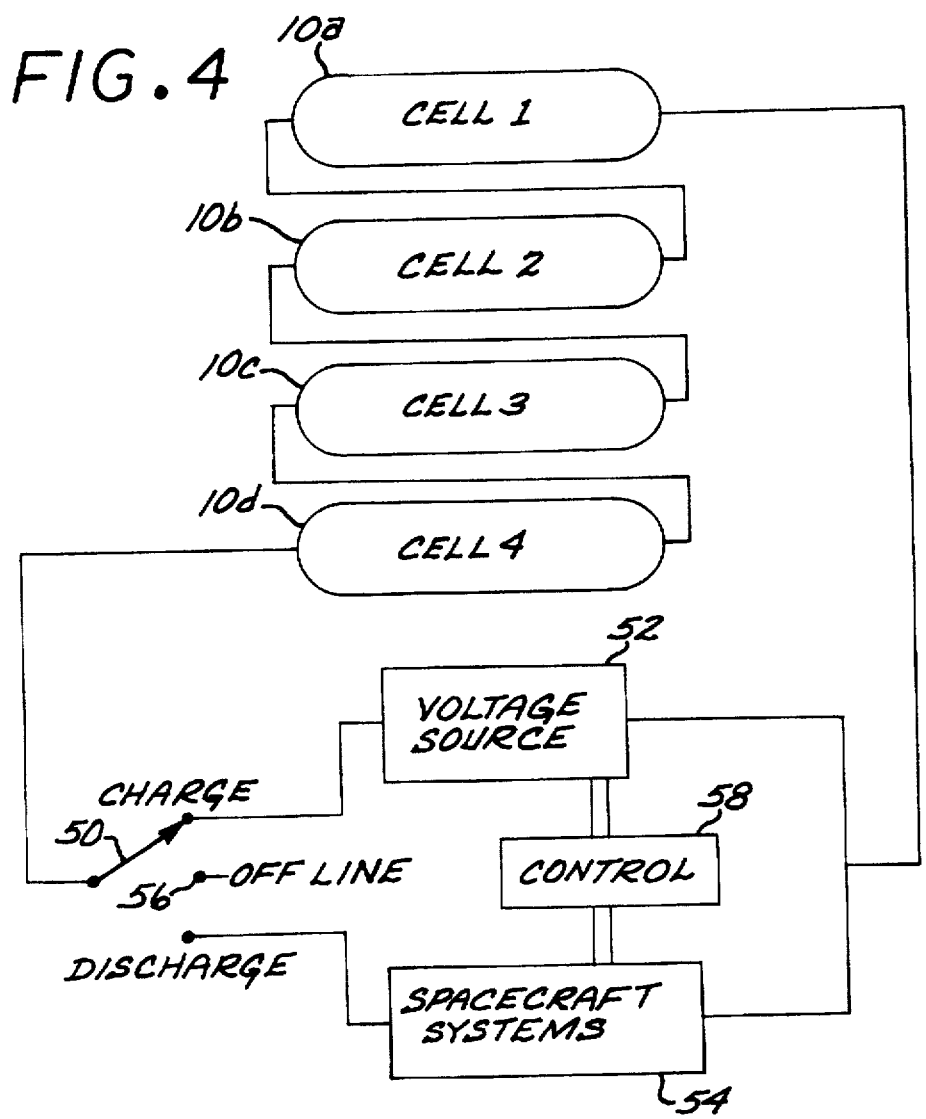
FIG. 4 is a schematic view of a battery system utilizing multiple nickel-hydrogen energy storage cells.

FIG. 4 illustrates a group of electrically interconnected energy storage cells 10 and their electrically interconnections, which together form a battery system. In this case, four energy storage cells 10a, 10b, 10c, and 10d are electrically connected in series for illustration, but the number of cells and their mode of interconnection may be varied as needed for a particular application. When the energy storage cells 10 are to be charged, they are connected by a switch 50 to a voltage source 52, which is typically the solar cell array of the spacecraft. When the energy storage cells 10 are to be discharged to produce useful power, they are connected by the switch 50 to spacecraft systems 54 that require power. A third switch position is an off-line position 56, where the cells are not connected to either the voltage source 52 or to the spacecraft systems 54. Additionally, there is normally a conventional electrical interconnection with its own control 58 directly between the voltage source 52 and the spacecraft systems 54 so that energy can be supplied to the spacecraft systems 54 independent of the switch 50.

Figure 5:
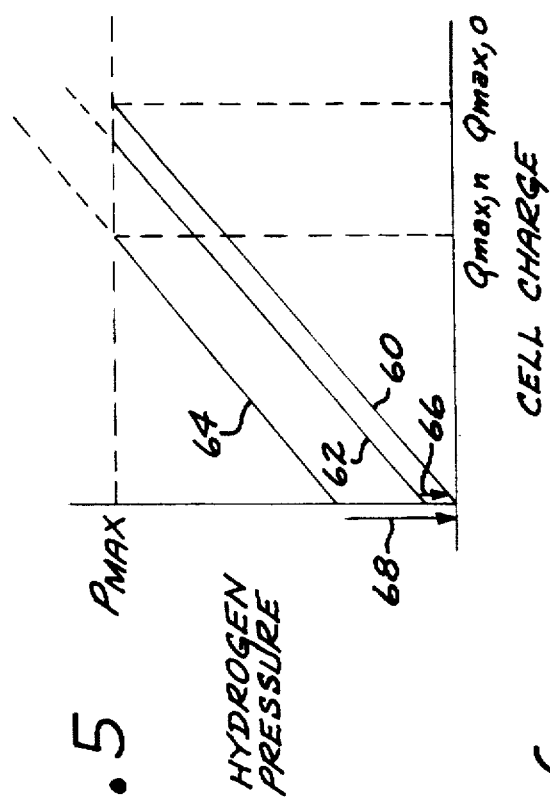
FIG. 5 is an idealized graph of the hydrogen pressure in energy storage cells as a function of charge.

FIG. 5 illustrates in an idealized form the hydrogen pressure within the pressure vessel 34 of the energy storage cells 10. In an initial charge/discharge cycle, all of the energy storage cells 10a–10d perform substantially in the same manner, as indicted by curve 60. In the energy-storage (charging) portion of the cycle, the charge on each energy storage cell 10 is gradually increased to a charge $Q_{max,o}$. The value of $Q_{max,o}$ is established by a permissible $P_{max}$, which is determined as the maximum safe internal pressure for the pressure vessels 34 of the energy storage cells 10a–10d and should not be exceeded. Upon discharge, the hydrogen pressure returns to a low pressure, typically about 0 psia.

The energy storage cells 10a–10d charge and discharge generally in a uniform manner and as shown by curve 60, for a first charge/discharge cycle. After many charge/discharge cycles, additional hydrogen may form in some or all of the energy storage cells due to corrosion and other effects. Although the following discussion of charge/discharge behavior after many cycles is idealized, it is fairly indicative of the nature of the dissimilar charging and discharging behavior of the energy storage cells of the interconnected group illustrated in FIG. 4.

Curve 62 illustrates the charge/discharge behavior of one of the energy storage cells 10a after n (typically hundreds or thousands) of charge/discharge cycles. In this case, very little additional hydrogen has been formed inside the pressure vessel of the energy storage cell 10a, and its charge/discharge curve 62 is close to that of the initial charge/discharge curve 60. Curve 64, on the other hand, illustrates the charge/discharge behavior of another of the energy storage cells 10c after the same n cycles. In this case, a much larger amount of hydrogen has been formed within the cell 10c, and the charge/discharge curve 64 is quite different from that of the initial charge/discharge curve 62. Such dissimilarities in the behavior of different energy storage cells of an array is expected.

The maximum value of the charge that may be stored in the cell 10c in the nth charge/discharge cycle, $Q_{max,n}$, is limited by $P_{max}$. Because of the large residual hydrogen pressure, $Q_{max,n}$ is considerably smaller than $Q_{max,o}$. The energy storage cells 10a–10d are connected in series, so the value of $Q_{max,n}$ determined by the behavior of the energy storage cell 10c establishes the maximum charge that may be stored in the other energy storage cells 10a, 10b, and 10d as well. Thus, the one energy storage cell that exhibits the greatest performance degradation over time sets the maximum charge that can be stored in the other energy storage cells as well.

Figure 6:
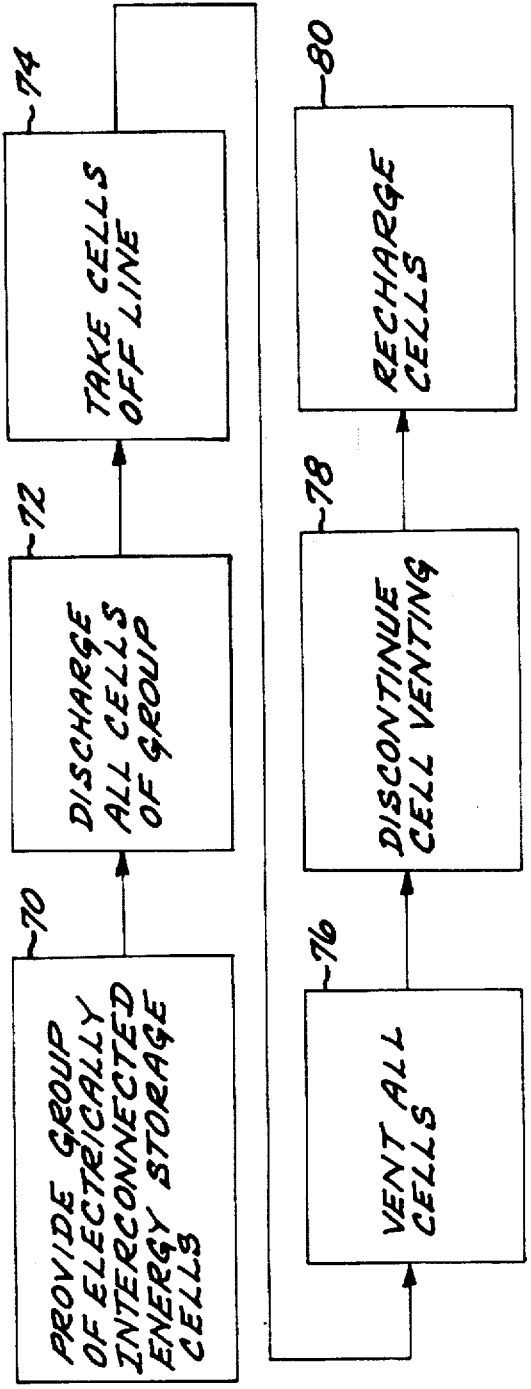
FIG. 6 is a block diagram of a method according to the invention.

FIG. 6 depicts in block diagram form a preferred approach for practicing the present invention, which overcomes the energy storage limitation just discussed. A group of electrically interconnected energy storage cells is provided, numeral 70, such as that of FIG. 4. All of the energy storage cells 10 of the group are discharged, numeral 72, by connecting the switch 50 to the spacecraft systems 54 and discharging the energy storage cells of the group. The discharging is to a substantially fully discharged state. Ideally, the substantially fully discharged state would leave each energy storage cell with 0 stored charge. Practically, however, it may be difficult to achieve a complete discharge, so that it is permissible to leave a small amount of charge in the cells, typically on the order of at most about 10 percent of the maximum stored charge of the energy storage cell.

The energy storage cells are taken off line, numeral 74, by positioning the switch 50 at the off-line position 56. The present approach is desirably practiced when the spacecraft systems 54 can be continuously provided with power from sources other than the storage cells 10, such as the direct connection through the controller 58 to the voltage source 52. This condition is easily satisfied for most satellites such as geosynchronous satellites, which are in directed, uninterrupted sunlight, so that their solar-cell voltage sources 52 are operable, for extended periods. In the event that the energy storage cells must be brought back on line after the pressure balancing of the invention is only partially completed, a partial benefit is realized and the process may be resumed and completed at a later time.

The energy storage cells 10 are all vented to reduce the hydrogen pressures therein, numeral 76. The venting is accomplished in the preferred embodiment by activating the heater 46 of the hydrogen vent 42 of each of the energy storage cells 10. The preferred hydrogen vent is that discussed herein and depicted in one embodiment in FIG. 3, but any operable hydrogen vent may be used.

Figure 7:
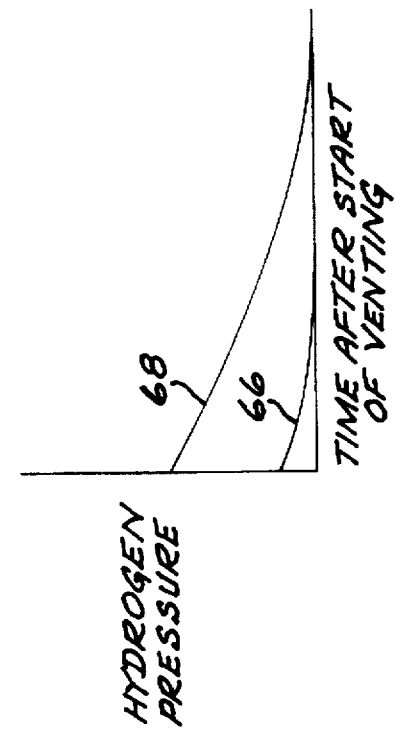
FIG. 7 is an idealized graph of hydrogen pressure as a function of time during venting of the energy storage cells to reestablish the uniform precharge.

FIGS. 5 and 7 illustrate the effect of venting the hydrogen from the fully discharged energy storage cells 10a and 10c, which had been previously discussed as examples. In FIG. 5, the venting of energy storage cell 10a is represented by a vertically downwardly directed line 66 at the vertical axis. The venting of energy storage cell 10c is represented by a vertically downwardly directed line 68 at the vertical axis. In each case in the idealized graphs, the lines 66 and 68 end at the origin, a zero (0) psia (pounds per square inch, absolute) hydrogen pressure. In practice, it is neither possible nor necessary for the hydrogen pressure to reach zero. A zero hydrogen pressure cannot be reached because that would imply a zero driving force for diffusion of hydrogen out of the energy storage cell. However, a significant reduction in hydrogen pressures in the various energy storage cells, and a consequent reduction in the nonuniformity of the hydrogen pressure between the various energy storage cells, provides a substantial benefit. Thus, as used herein, "about 0" in reference to the hydrogen pressure reached in step 76 means that a zero pressure would be ideal. Somewhat larger pressures are acceptable, because any reduction in the nonuniformity between the energy storage cells of the hydrogen pressures at substantially 0 charge, toward substantially the same pressure within the energy storage cells, confers the benefits discussed herein to a partial degree.

FIG. 7 illustrates the hydrogen pressure for the lines 66 (cell 10a) and 68 (cell 10c) as a function of time after the start of venting. Because the hydrogen pressure in the cell 10a is lower than that in the cell 10c at the start of venting, the hydrogen pressure in the cell 10a reaches about zero before that in the cell 10c. However, with sufficient venting time, both cells 10a and 10c reach about zero hydrogen pressure. The total venting time required to vent the maximum hydrogen overpressures encountered in cells 10 to 0 pressure is on the order of hours to a few days for a diffusion temperature of about 200° C., which total venting times are easily less than the time during which the spacecraft systems can be powered directly so that the cells 10 may be off line for venting. If more rapid venting is desired, the diffusion temperature produced by the heater 46 may be increased, up to about 700° C. The higher temperatures are not preferred, because of possible degradation of the hollow tube 44 and increased power requirements for heating to high temperature.

When the hydrogen pressures within the cells 10 reach about 0 psia, the venting is discontinued, numeral 78. The cells are thereafter recharged, numeral 80, by operating the switch 50 to connect the energy storage cells 10 to the voltage source 52. The cycles of charging and discharging are resumed.

Upon completion of the method just described for resetting the precharge of the cells 10, the charging/discharging performance reverts back to that of line 60 for all of the cells, inasmuch as the varying hydrogen overpressures have been negated by the venting operation. Consequently, the maximum permissible charging of all of the energy storage cells reverts to $Q_{max,o}$, the initial value, rather than the degraded value $Q_{max,n}$. With additional hundreds or thousands of charging/discharging cycles, the buildup of uneven hydrogen overpressures depicted in FIG. 5 is likely to repeat. In that event, the precharge resetting and pressure balancing method depicted in FIG. 6 is repeated.

The present invention thus provides a way for the energy storage cells of a spacecraft or other system to be restored to their initial precharge state remotely and after many charging/discharging cycles. Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for pressure balancing a group of electrically interconnected energy storage cells, comprising the steps of:
   providing a group of at least two electrically interconnected pressurized-hydrogen energy storage cells;
   discharging the energy storage cells of the group to a substantially fully discharged state;
   venting all of the energy storage cells of the group to a reduced internal hydrogen pressure and thereafter discontinuing the venting, the step of venting to occur without recharging the energy storage cells; and thereafter
   recharging the energy storage cells of the group.

2. The method of claim 1, wherein the step of discharging includes the step of
   discharging the energy storage cells of the group to no more than about 10 percent of their fully charged states.

3. The method of claim 1, wherein the step of providing includes the step of providing at least two electrically interconnected energy storage cells, each energy storage cell comprising
   a hermetic pressure vessel having a wall,
   vent means through the wall of the pressure vessel for controllably removing hydrogen from the interior of the pressure vessel,
   at least one plate set within the wall of the pressure vessel, each plate set comprising a positive electrode and a negative electrode,
   an electrolyte, and
   a pair of electrical leads extending from the at least one plate set and through an electrical feedthrough in the wall of the pressure vessel to an exterior of the pressure vessel.

4. The method of claim 1, wherein the step of providing includes the step of providing at least two electrically interconnected energy storage cells, each energy storage cell comprising
   a hermetic pressure vessel having a wall, a first portion of the wall being made of a first material having a relatively low diffusion coefficient of hydrogen therethrough;
   vent means through the wall of the pressure vessel for removing hydrogen from the interior of the pressure vessel, the vent means including a vent segment of the wall of the pressure vessel made of a second material that permits the catalyzed diffusion of hydrogen therethrough;

at least one plate set within the wall of the pressure vessel, each plate set comprising a positive electrode and a negative electrode;

an electrolyte; and a pair of electrical leads extending from the at least one plate set and through an electrical feedthrough in the wall of the pressure vessel to an exterior of the pressure vessel.

5. The method of claim 4, wherein the step of providing at least two electrically interconnected energy storage cells includes the step of providing the vent segment made of a material comprising palladium.

6. The method of claim 1, including an additional step, after the step of providing and prior to the step of discharging, of cycling the group of energy storage cells through a plurality of charging and discharging cycles.

7. The method of claim 1, wherein the step of venting includes the step of reducing the internal hydrogen pressure of all of the energy storage cells to substantially the same value.

8. A method for pressure balancing a group of electrically interconnected energy storage cells, comprising the steps of:

providing a group of at least two electrically interconnected energy storage cells, each of the energy storage cells including a hermetic pressure vessel and at least one plate set within the pressure vessel;

cycling the group of energy storage cells through a plurality of charging and discharging cycles;

discharging each of the energy storage cells of the group to a substantially fully discharged state;

venting all of the energy storage cells of the group to a reduced internal hydrogen pressure and thereafter discontinuing the venting, the step of venting to occur without recharging the energy storage cells; and thereafter recharging the energy storage cells of the group.

9. The method of claim 8, wherein the step of discharging includes the step of discharging the energy storage cells of the group to no more than about 10 percent of their fully charged states.

10. The method of claim 8, wherein the step of providing includes the step of providing at least two electrically interconnected energy storage cells, each energy storage cell comprising vent means through the wall of the pressure vessel for removing hydrogen from the interior of the pressure vessel, the vent means including a vent segment of the wall of the pressure vessel made of a material that permits the catalyzed diffusion of hydrogen therethrough.

11. The method of claim 10, wherein the step of providing at least two electrically interconnected energy storage cells includes the step of providing a heater operable to controllably heat at least part of the vent segment.

12. The method of claim 10, wherein the step of providing at least two electrically interconnected energy storage cells includes the step of providing the vent segment in the form of a hollow tube joined to the wall of the pressure vessel and made at least in part of the material that permits the catalyzed diffusion of hydrogen therethrough, an interior of the hollow tube being in communication with an interior of the pressure vessel.

13. The method of claim 10, wherein the step of providing at least two electrically interconnected energy storage cells includes the step of providing the material that permits the catalyzed diffusion of hydrogen therethrough comprising palladium.

14. The method of claim 8, wherein the step of venting includes the step of reducing the hydrogen pressure of each of the energy storage cells to substantially zero hydrogen pressure.

* * * * *